US010807911B2

(12) United States Patent
Matsuda et al.

(10) Patent No.: US 10,807,911 B2
(45) Date of Patent: Oct. 20, 2020

(54) CONCRETE COMPOSITION AND PRODUCTION METHOD THEREFOR

(71) Applicants: SUMITOMO MITSUI CONSTRUCTION CO., LTD., Tokyo (JP); THE UNIVERSITY OF TOKYO, Tokyo (JP); TOKYO UNIVERSITY OF SCIENCE FOUNDATION, Tokyo (JP)

(72) Inventors: Taku Matsuda, Tokyo (JP); Takafumi Noguchi, Tokyo (JP); Manabu Kanematsu, Tokyo (JP)

(73) Assignees: SUMITOMO MITSUI CONSTRUCTION CO., LTD., Tokyo (JP); THE UNIVERSITY OF TOKYO, Tokyo (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 16/626,780

(22) PCT Filed: Apr. 11, 2018

(86) PCT No.: PCT/JP2018/015172
§ 371 (c)(1),
(2) Date: Dec. 26, 2019

(87) PCT Pub. No.: WO2019/003572
PCT Pub. Date: Jan. 3, 2019

(65) Prior Publication Data
US 2020/0115282 A1 Apr. 16, 2020

(30) Foreign Application Priority Data

Jun. 29, 2017 (JP) .................................. 2017-127620

(51) Int. Cl.
*C04B 28/08* (2006.01)
*C04B 14/06* (2006.01)
*C04B 14/28* (2006.01)
*C04B 18/14* (2006.01)
*C04B 22/06* (2006.01)

(52) U.S. Cl.
CPC ............ *C04B 28/082* (2013.01); *C04B 14/06* (2013.01); *C04B 14/28* (2013.01); *C04B 18/144* (2013.01); *C04B 18/146* (2013.01); *C04B 22/062* (2013.01)

(58) Field of Classification Search
CPC ....... C04B 14/06; C04B 14/28; C04B 18/144; C04B 18/146; C04B 22/062; C04B 28/082
See application file for complete search history.

(56) References Cited

U.S. PATENT DOCUMENTS

| 3,834,916 A * | 9/1974 | Kesler ................. C04B 20/0048 106/644 |
| 5,316,572 A * | 5/1994 | Okamura ................ C04B 28/02 106/714 |
| 6,875,265 B1 * | 4/2005 | Kang ..................... C04B 41/009 106/714 |
| 8,147,609 B2 * | 4/2012 | Jau ......................... C04B 28/02 106/705 |
| 9,902,650 B2 * | 2/2018 | Guerini ................. C04B 28/008 |
| 10,597,328 B2 * | 3/2020 | Ibrahim .................. C04B 28/04 |
| 2012/0010331 A1 * | 1/2012 | Yonezawa ................ C04B 7/19 524/5 |

FOREIGN PATENT DOCUMENTS

| CN | 1470472 A | 1/2004 |
| CN | 103613294 A | 3/2014 |
| CN | 104058678 A * | 9/2014 |
| CN | 106587788 A * | 4/2017 |
| JP | 05-286746 | 11/1993 |
| JP | 2001-261415 | 9/2001 |
| JP | 2010111538 A * | 5/2010 |
| JP | 2010-189219 | 9/2010 |
| JP | 2011006321 A * | 1/2011 |
| JP | 2011-168978 | 9/2011 |
| JP | 2012-214317 | 11/2012 |
| JP | 2012211040 A * | 11/2012 |
| JP | 2014-148428 | 8/2014 |
| JP | 2014-148434 | 8/2014 |
| JP | 2014-201478 | 10/2014 |
| JP | 2015-131747 | 7/2015 |
| JP | 2015-180603 | 10/2015 |
| JP | 2016-088778 | 5/2016 |
| JP | 2016-185888 | 10/2016 |
| JP | 2016-199445 | 12/2016 |

(Continued)

OTHER PUBLICATIONS

WIPO Office, International Search Report issued in corresponding International Patent Application No. PCT/JP2018/015172 dated Jul. 17, 2018.
WIPO Office, Written Opinion of the International Search Authority issued in corresponding International Patent Application No. PCT/JP2018/015172 dated Jul. 17, 2018.
Japanese Patent Office, Notice of Reasons for Refusal issued in corresponding Japanese Patent Application No. 2018-549360 dated Feb. 15, 2019.
Taiwanese Office Action dated Mar. 16, 2020 issued in corresponding Taiwanese Patent Application No. 10920234240.
Notice of Reasons for Cancellation dated Feb. 20, 2020 issued in corresponding Japanese Patent Application No. 2019-700883.

(Continued)

*Primary Examiner* — Anthony J Green
(74) *Attorney, Agent, or Firm* — Carmody Torrance Sandak & Hennessey LLP

(57) ABSTRACT

Provided is a concrete composition, including: blast furnace slag; at least any one of expansive additive and cement; and water, wherein a unit water content of the water is 130 kg/m³ or less; wherein a content of the cement is 22% by mass or less relative to the blast furnace slag, and wherein a slump flow value of the concrete composition is 40 cm or greater.

10 Claims, No Drawings

(56) References Cited

FOREIGN PATENT DOCUMENTS

| JP | 2017-75071 | | 4/2017 | | |
|---|---|---|---|---|---|
| KR | 100874584 | B1 * | 12/2008 | ............ | C04B 18/146 |
| KR | 1020090036952 | A * | 4/2009 | ............. | C04B 14/02 |
| KR | 10-2012-0048133 | | 5/2012 | | |

OTHER PUBLICATIONS

Kenichi Horiguchi, et al., "Development of concrete secondary products using low-carbon concrete", Proceedings of the Japan Concrete Institute, vol. 38, No. 1, 2016, pp. 213-218 (Demandant's Exhibit No. 1) (Partial translation).
Brochure of "High-performance AE water-reducing additive (thickener single liquid type) FLOWRIC SF500F.FR", Flowric, Co., Oct. 2015 (Demandant's Exhibit No. 2-1) (Partial translation).
"Chemical Admixture FLOWRIC SF500F.Series" applied in moderate-high-fluidity concrete in the general strength range, Information posted on the website NETIS (http://www.netis.mlit.go.jp/Netis-Rev/), print of Oct. 18, 2019 (Demandants Exhibit No. 2-2) (Partial translation).
"Chemical Admixture FLOWERIC SF500F.Series" applied in moderate-high-fluidity concrete in the general strength range, Information posted on the website Netis (http://www.netis.mlit.go.jp/NetisRev/), print of Oct. 18, 2019 (Demandants Exhibit No. 2-3) (Partial translation).
"Chemical Admixture Flowric SF500E-Series' applied in moderate-high-fluidity concrete in the general strength range", Information posted on the website NETIS (http://www.netis.mlit.go.jp/Netis-Rev/), print of Oct. 18, 2019 (Demandant's Exhibit No. 2-4)(Partial translation).
Brochure of "MasterGlenium 6500/6550", BASF Japan Ltd., Construction Chemical Division, Pozzolith Solutions Ltd., Apr. 2017 (Demandant's Exhibit No. 3) (Partial translation).
Yuta Furukawa, et al., "Study on practical applications of high-fluidity concrete using thickener single liquid, high-performance AE water-reducing additive in the ordinary strength range", Tokyu Construction Technical Report No. 40 Feb. 28, 2015, pp-1-6 (Demandant's Exhibit No. 4) (Partial translation).
Katsuhiko Tada, et al. ,"The Influence of Crushed Limestone Aggregate on the Properties of Concrete," Concrete Journal, vol. 50, No. 10, Oct. 2012, pp. 904-911 (Demandant's Exhibit No. 11) (Partial translation).
Korean Office Action dated May 14, 2020 issued in corresponding Korean Patent Application No. 10-2020-7002043.
Indian Patent Office, Examination Report issued in Indian Application No. 202047003110 dated Aug. 7, 2020.

* cited by examiner

CONCRETE COMPOSITION AND PRODUCTION METHOD THEREFOR

TECHNICAL FIELD

The present invention relates to a concrete composition, and a method for producing the same.

BACKGROUND ART

Concrete obtained by hardening concrete compositions is widely used for architectural works such as buildings. Generally, the concrete compositions contain a cement-containing binder, fine aggregate such as sand, coarse aggregate such as stones, and water. With changes of the kinds and the amounts of the substances contained in the concrete compositions, hardened products of the concrete compositions having desired properties (for example, strength and fluidity) can be obtained.

The cement is typically produced by the method described below. Materials such as limestone and clay are fired at a high temperature, to produce a composition called cement clinker. The cement clinker is ground, and plaster is added to the resultant. In this way, the cement is obtained. Because carbon dioxide is emitted in the step of producing the cement clinker, the cement is said to have environmental impact. Hence, there have been proposed low environmental impact concrete compositions that are suppressed in use of the cement (for example, see PTLs 1 and 2).

However, the proposed concrete compositions contain water relatively in a high amount, with a water content (unit water content) of about from 160 kg/m$^3$ through 174 kg/m$^3$ each. It is known that the concrete compositions typically undergo shrinkage (autogenous shrinkage) when they harden. Furthermore, it is known that the concrete compositions also undergo shrinkage (drying shrinkage) after they have hardened, due to, for example, water evaporation. Hence, when such concrete compositions as proposed that have a relatively high water content are hardened, shrinkage occurs and constitutes a factor of cracking.

As the concrete compositions with a low water content (unit water content), there have been proposed concrete compositions suppressed in the unit water content to about from 80 kg/m$^3$ through 85 kg/m$^3$ (for example, see PTLs 3 and 4).

However, the proposed concrete compositions can only be used for special purposes such as dams because they do not have a good fluidity. The concrete compositions are required to have a good fluidity because they are used for various architectural works.

CITATION LIST

Patent Literature

PTL 1: Japanese Patent Application Laid-Open (JP-A) No. 2014-148434
PTL 2: JP-A No. 2010-189219
PTL 3: JP-A No. 2015-180603
PTL 4: JP-A No. 2011-168978

SUMMARY OF INVENTION

Technical Problem

Hence, concrete compositions that have a low environmental impact, have the same strength as that of existing concrete when hardened, and have a good fluidity have been demanded.

The present invention has an object to provide a concrete composition that has a low environmental impact, has the same strength as that of existing concrete when hardened, and has a good fluidity, and a method for producing the same.

Solution to Problem

Means for solving the above problems are as follows.
<1> A concrete composition, including:
  blast furnace slag;
  at least any one of expansive additive and cement; and
  water,
  wherein a unit water content of the water is 130 kg/m$^3$ or less;
  wherein a content of the cement is 22% by mass or less relative to the blast furnace slag, and
  wherein a slump flow value of the concrete composition is 40 cm or greater.
<2> The concrete composition according to <1>,
  wherein the slump flow value is 50 cm or greater.
<3> The concrete composition according to <1> or <2>,
  wherein the unit water content of the water is 100 kg/m$^3$ or less.
<4> The concrete composition according to any one of <1> to <3>,
  wherein a content of the expansive additive is 3 kg/m$^3$ or greater.
<5> The concrete composition according to any one of <1> to <4>,
  wherein a content of the expansive additive is 5 kg/m$^3$ or greater.
<6> The concrete composition according to any one of <1> to <5>, further including:
  ferro-nickel slag.
<7> The concrete composition according to any one of <1> to <6>,
  wherein the content of the cement is 0% by mass relative to the blast furnace slag.
<8> The concrete composition according to any one of <1> to <7>, further including:
  limestone.
<9> The concrete composition according to any one of <1> to <8>,
  wherein the expansive additive is lime-based expansive additive.
<10> A method for producing a concrete composition including blast furnace slag, at least any one of expansive additive and cement, and water,
  wherein a unit water content of the water is 130 kg/m$^3$ or less;
  wherein a content of the cement is 22% by mass or less relative to the blast furnace slag, and
  wherein a slump flow value of the concrete composition is 40 cm or greater.

Advantageous Effects of Invention

The present invention can provide a concrete composition that has a low environmental impact, has the same strength as that of existing concrete when hardened, and has a good fluidity, and a method for producing the same.

DESCRIPTION OF EMBODIMENTS (Concrete Composition)

A concrete composition of the present invention contains blast furnace slag, at least any one of expansive additive and cement, and water, and further contains other components as needed.

<Blast Furnace Slag>

The blast furnace slag is a product (by-product) collected from a step of producing pig iron from iron ore, as a combination of any other components contained in the iron ore than iron with ash in limestone and coke, which are auxiliary materials. The blast furnace slag contains, for example, CaO, $SiO_2$, $Al_2O_3$, and MgO.

The blast furnace slag is not particularly limited and may be appropriately selected depending on the intended purpose, so long as the blast furnace slag is one that is used for typical concrete compositions. Examples of the blast furnace slag include blast furnace slag used in JIS R 5211 "Portland blast-furnace slag cement", and blast furnace slag compliant as JIS A 6206 "Ground granulated blast-furnace slag for cement".

The fineness of the blast furnace slag is not particularly limited, may be appropriately selected depending on the intended purpose, and is preferably 3,000 $cm^2/g$ or higher but 13,000 $cm^2/g$ or lower, and more preferably 3,000 $cm^2/g$ or higher but 8,000 $cm^2/g$ or lower. When the value of the fineness is in the range mentioned above, the fluidity of the concrete composition and the strength of a hardened product of the concrete composition can be good.

The content of the blast furnace slag is not particularly limited, may be appropriately selected depending on the intended purpose, and is preferably from 200 $kg/m^3$ through 500 $kg/m^3$ relative to the whole concrete composition. When the content of the blast furnace slag is in the range mentioned above, the strength of a hardened product of the concrete composition can be good.

<Expansive Additive>

The expansive additive refers to a material from which calcium ions are eluted when the material is immersed in water. The expansive additive is not particularly limited and may be appropriately selected depending on the intended purpose, so long as the expansive additive is compliant as "Expansive additive for concrete" on Japanese Industrial Standard JIS A 6202. Examples of the expansive additive include lime-based expansive additive mainly containing CaO and $CaSO_4$, and ettringite-based expansive additive mainly containing CaO, $C_3A/CaSO_4$, and $CaSO_4$. One of these kinds of expansive additive may be used alone or two or more of these kinds of expansive additive may be used in combination. Among these kinds of expansive additive, lime-based expansive additive containing calcium oxide is preferable in terms of reducing shrinkage.

The expansive additive is one specific example of a binder property inducing material for the blast furnace slag.

The binder property inducing material for the blast furnace slag (hereinafter, may be abbreviated as "inducing material") is a substance that makes the blast furnace slag express a property as a binder.

The blast furnace slag does not express a property as a binder by itself. However, when the binder property inducing material for the blast furnace slag acts on the blast furnace slag, the property as a binder becomes able to function. This is because the inducing material reacts with silica ($SiO_2$) and alumina ($Al_2O_3$) contained in the blast furnace slag. By containing the binder property inducing material for the blast furnace slag, the concrete composition hardens.

An alkaline stimulant is suitably used as the binder property inducing material for the blast furnace slag.

In the present invention, the alkaline stimulant refers to a material, of which aqueous solution (or suspension) produced when it is mixed with water is alkaline. One specific example of the alkaline stimulant is the expansive additive.

The content of the expansive additive is not particularly limited, may be appropriately selected depending on the intended purpose, and is preferably 3 $kg/m^3$ or greater, more preferably 5 $kg/m^3$ or greater, and yet more preferably 15 $kg/m^3$ or greater. When the content of the expansive additive is preferably 200 $kg/m^3$ or less.

<Cement>

The cement is not particularly limited and may be appropriately selected depending on the intended purpose so long as the cement is cement typically used in concrete compositions. Examples of the cement include various Portland cements such as ordinary, moderate heat, low heat, early strength, ultra high early strength, and sulfate resisting, mixed cements such as blast furnace cement, fly ash cement, and silica cement, special super-high early strength cements such as alumina cement and jet cement, and Erwin cement. One of these cements may be used alone or two or more of these cements may be used in combination.

The content of the cement is 22% by mass or less, preferably 5% by mass or less, and more preferably 0% by mass (substantially not contained) relative to the mass of the blast furnace slag in terms of reducing environmental impact.

<Water>

The water is not particularly limited and may be appropriately selected depending on the intended purpose.

The unit water content (content) of the water is 130 $kg/m^3$ or less, preferably 110 $kg/m^3$ or less, more preferably 100 $kg/m^3$ or less, and yet more preferably 85 $kg/m^3$ or less. When the unit water content is 130 $kg/m^3$ or less, shrinkage of a hardened product of the cement composition can be reduced.

The unit water content is preferably 65 $kg/m^3$ or greater and more preferably 75 $kg/m^3$ or greater in terms of fluidity.

The ratio of the mass of the water to the mass of the blast furnace slag (water/blast furnace slag ratio) is preferably 36% by mass or less. When the water/blast furnace slag ratio is 36% by mass or less, fluidity can be improved.

When the water/blast furnace slag ratio is greater than 36% by mass, an appropriate fluidity cannot be obtained.

<Other Components>

The other components are not particularly limited and may be appropriately selected depending on the intended purpose, so long as the other components are used in typical concrete compositions. Examples of the other components include silica fume, fly ash, fine aggregate, coarse aggregate, and an admixture.

<<Silica Fume>>

The silica fume refers to fine particles (with an average primary particle diameter of about from 0.1 micrometers through 1.0 micrometer) obtained by collecting dust from exhaust gases emitted in the process of smelting, for example, ferrosilicon, fused zirconia, and metallurgical silicon. The silica fume is mainly formed of amorphous $SiO_2$, and further contains, for example, alumina, iron oxide, calcium oxide, and titanium oxide.

When mixed with the binder property inducing material for the blast furnace slag, the silica fume undergoes reaction (pozzolanic reaction) with calcium hydroxide produced during hydration of the binder property inducing material for the blast furnace slag, to function to improve the strength of a hardened product of the concrete composition.

The content of the silica fume is preferably 80 kg/m$^3$ or greater but 130 kg/m$^3$ or less. When the content of the silica fume is in this numerical range, the fluidity of a hardened product of the concrete composition can be good.

<<Fly Ash>>

The fly ash refers to industrial waste generated in a coal-fired power plant. In the coal-fired power plant, finely ground coal is burned in a boiler, and the energy involved is converted to electricity. This burning turns the coal to ash. Particles of the ash in a melted state float in the high-temperature burning gas, become spherical fine particles as the temperature thereof decreases at the boiler outlet, and are collected by an electrical dust precipitator. The spherical fine particles collected are generally called fly ash.

When mixed with the binder property inducing material for the blast furnace slag, the fly ash undergoes reaction (pozzolanic reaction) with calcium hydroxide produced during hydration of the binder property inducing material for the blast furnace slag, to function to improve the strength of a hardened product of the concrete composition.

The fly ash contains plenty of silica ($SiO_2$) and alumina ($Al_2O_3$), and further contains iron oxide, magnesium oxide, and calcium oxide.

For fly ashes used in concrete compositions, four types of qualities (fly ashes type I to type IV)) are specified by JIS. In the present invention, any quality can be used. Among these qualities, the type-I fly ash is preferable in terms of enhancing the fluidity, and the strength of a hardened product.

The content of the fly ash is preferably 100 kg/m$^3$ or greater but 300 kg/m$^3$ or less. When the content of the fly ash is in this numerical range, the fluidity of the concrete composition and the strength of a hardened product of the concrete composition can be good.

<<Fine Aggregate>>

The fine aggregate is not particularly limited, may be appropriately selected depending on the intended purpose, and may be a natural material or an artificial material, so long as the fine aggregate is one that is used in typical concrete compositions. Specific examples of the fine aggregate include ferro-nickel slags (FNS1.2A-compliant products and FNS5A-compliant products on Japanese Industrial Standards JIS A 5011-2), copper slags (CUS1.2-compliant products on Japanese Industrial Standards JIS A 5011-3), electric arc furnace oxidizing slags (EFS1.2 N- or H-compliant products on Japanese Industrial Standards JIS A 5011-4), and hard sandstone crushed sand. One of these fine aggregates may be used alone or two or more of these fine aggregates may be used in combination. Among these fine aggregates, ferro-nickel slags are preferable because they can reduce shrinkage.

Among the ferro-nickel slags, the ferro-nickel slags having the following characteristics at the same time are preferable because they can reduce shrinkage.

To have a coefficient of water absorption of 1.50% or higher

To have a water content ratio decrease to 0.50% or lower when the ferro-nickel slags are put in an environment having a temperature of approximately 20 degrees C. and a relative humidity of approximately 95% after they have been brought into a saturated condition The coefficient of water absorption refers to the ratio of the mass (g) of water when the surface of the ferro-nickel slags is in a dried condition (surface-dried condition) and the voids in the ferro-nickel slags are in a saturated condition to the mass (g) of the ferro-nickel slags in an absolute dry condition. The water content ratio refers to the ratio of the total mass (g) of water contained in the voids in the ferro-nickel slags and surface water (water attached to the surface of the fine aggregates) to the mass (g) of the ferro-nickel slags in an absolute dry condition. A water content amount is a value that changes depending on the dry condition of the ferro-nickel slags.

Examples of the ferro-nickel slags having the characteristics described above include PAMCOSAND (registered trademark) available from Pacific Metals Co., Ltd.

The content of the fine aggregate is preferably 900 kg/m$^3$ or greater but 1,300 kg/m$^3$ or less. When the content is in the numerical range, fluidity, and the strength of a hardened product are good.

<<Coarse Aggregate>>

The coarse aggregate is not particularly limited, may be appropriately selected depending on the intended purpose, and may be a natural material or an artificial material, so long as the coarse aggregate is one that is used in typical concrete compositions.

Examples of the natural coarse aggregate include crushed stone 2015, crushed stone 2013, crushed stone 2010, crushed stone 1505, and crushed stone 1305, which are "crushed stones for concrete" on Japanese Industrial Standards JIS A 5005, and coarse aggregates compliant as, for example, No. 5 or No. 6 of "Crushed stone for road construction" on Japanese Industrial Standards JIS A 5001. Specific examples thereof include hard sandstone crushed stone, Andesite crushed stone, basalt crushed stone, quartz schist crushed stone, and crushed limestone.

Examples of the synthetic coarse aggregate include coarse aggregates compliant as ferro-nickel slag aggregates (by-products from ferro-nickel production) on Japanese Industrial Standards JIS A 5011-2. Specific examples thereof include artificial corundum and sintered bauxite.

Among these coarse aggregates, crushed limestone is preferable in terms of reducing shrinkage.

The content of the coarse aggregate is preferably 500 kg/m$^3$ or greater but 1,000 kg/m$^3$ or less. When the content is in the numerical range, fluidity, and the strength of a hardened product are good.

<<Admixture>>

The admixture (hereinafter, also referred to as "chemical admixture") is not particularly limited and may be appropriately selected depending on the intended purpose, so long as the admixture is one that is used in typical concrete compositions. Specific examples of the admixture include common polycarboxylic acid-based superplasticizers having a high water reducing ratio, and defoamers such as polyoxyalkylene alkyl ether-based defoamers.

The addition amount of the polycarboxylic acid-based superplasticizer is appropriately adjusted depending on the concrete composition.

<Physical Properties of Concrete Composition and Hardened Product Thereof>

The concrete composition of the present invention has the following physical properties.

—Slump Flow Value—

The slump flow value is a value indicating the fluidity of the concrete composition. In the method for measuring the slump flow value, measurement is performed according to "Method of test for slump flow of concrete" on Japanese Industrial Standards JIS A 1150.

The slump flow value of the concrete composition of the present invention is 40 cm or greater and preferably 50 cm or greater in terms of homogeneity and workability.

—Compressive Strength—

The compressive strength is measured according to "Method of test for compressive strength of concrete" on Japanese Industrial Standards JIS A 1108. The samples used for measuring the compressive strength are ones that are 7 days old and 28 days old as the material age (i.e., the time that has passed since mixing of the concrete composition was started, i.e., since water was added to the binder property inducing material for the blast furnace slag).

—Shrinkage Strain (Autogenous Shrinkage Strain, Drying Shrinkage Strain)—

The autogenous shrinkage strain is measured according to a method compliant with the method of Autogenous Shrinkage Study Group of Japan Concrete Institute and Superfluid Concrete Study Group of Japan Concrete Institute. The material is unsealed at a material age of 7 days, and a synthetic value of the autogenous shrinkage strain and the drying shrinkage strain is measured in a dry environment. Measurement of the shrinkage strain is performed until a material age of 28 days.

(Method for Producing Concrete Composition)

The method for producing the concrete composition of the present invention is not particularly limited and may be appropriately selected depending on the intended purpose so long as it is a method for producing a typical concrete composition. For example, the concrete composition can be produced by the following method. In a thermostatic chamber of 20 degrees C., the components other than water (e.g., the blast furnace slag, and at least any one of the binder property inducing material and the cement) are fed into a mixer and dry-mixed, and then mixed with water added.

Apparatuses such as the mixer are not particularly limited and may be appropriately selected depending on the intended purpose, so long as they are used for typical concrete compositions.

EXAMPLES

The present invention will be described below by way of Examples. The present invention should not be construed as being limited to the Examples below.

Examples 1 to 23 and Comparative Examples 1 to 3

<Production of Concrete Compositions>

Concrete compositions of Examples 1 to 23 and Comparative Examples 1 to 3 were produced according to the mix proportion presented in Tables 2-1 and 2-2. For each concrete composition, the components other than water were fed into a biaxial forced mixer having a nominal capacity of 0.1 m$^3$ (available from Pacific Machinery & Engineering Co., Ltd., SD-100, 200 V three-phase motor output of 7.5 kW) in a thermostatic chamber of 20 degrees C., dry-mixed for 15 seconds, and then mixed for 300 seconds with water added. The mixing amount per batch was constant at 0.090 m$^3$.

Abbreviations, product names, and manufacturer or distributor names of the components used in Examples 1 to 23 and Comparative Examples 1 to 3 are as presented in Table 1 below.

TABLE 1

| | | Abbrev. | Product name | Physical property | Manufacturer/distributer name |
|---|---|---|---|---|---|
| Blast furnace slag | | BF | CERAMENT A | Density: 2.89 Specific surface area: 4,460 cm$^2$/g | DC Co., Ltd. |
| Cement | Ordinary Portland cement | NC | — | Density: 3.16 Specific surface area: 3,320 cm$^2$/g | Taiheiyo Cement Corporation |
| | Early strength Portland cement | HC | — | Density: 3.14 Specific surface area: 4,490 cm$^2$/g | Taiheiyo Cement Corporation |
| Binder property inducing material for blast furnace slag | Ettringite-based expansive additive | EX1 | SACS | Density: 2.93 Specific surface area: 2,850 cm$^2$/g | Sumitomo Osaka Cement Co., Ltd. |
| | Lime-based expansive additive | EX2 | TAIHEIYO N-EX | Density: 3.19 Specific surface area: 4,970 cm$^2$/g | Taiheiyo Materials Corporation |
| Silica fume | | SF | EFACO | Density: 2.20 Specific surface area: 200,000 cm$^2$/g | Tomoe Engineering Co., Ltd. |
| Fly ash | | FA | FINASH (permissible substitute for JIS type I) | Density: 2.40 Specific surface area: 5,540 cm$^2$/g | Yonden Business Co., Inc. |
| Fine aggregate | Ferro-nickel slag fine aggregate | FNS | PAMCOSAND | Density: 2.98 Coefficient of water absorption: 2.25 | Taiheiyo Kinzoku Corporation |
| | Hard sandstone crushed sand | HS | — | Density: 2.62 Coefficient of water absorption: 0.81 | Ores Inc. |
| Coarse aggregate | Hard sandstone crushed stone | HG | — | Density: 2.64 Coefficient of water absorption: 0.68 | Ores Inc. |
| | Crushed limestone | LG | — | Density: 2.74 Coefficient of water absorption: 0.48 | Toya Company Ltd. |

TABLE 2-1

| | | Cement | | | Binder property inducing material for blast furnace slag Expansive additive (EX) | | Cement/blast furnace slag |
|---|---|---|---|---|---|---|---|
| | | Blast furnace slag BF [kg/m³] | Ordinary Portland cement NC [kg/m³] | Early strength Portland cement HC [kg/m³] | Etringite-based EX1 [kg/m³] | Lime-based EX2 [kg/m³] | mass ratio C/BF [%] |
| Ex. | 1 | 309 | 0 | 0 | 0 | 20 | 0 |
| | 2 | 309 | 0 | 0 | 0 | 10 | 0 |
| | 3 | 309 | 0 | 0 | 0 | 5 | 0 |
| | 4 | 307 | 0 | 0 | 20 | 0 | 0 |
| | 5 | 253 | 56 | 0 | 20 | 0 | 22 |
| | 6 | 253 | 56 | 0 | 0 | 0 | 22 |
| | 7 | 281 | 28 | 0 | 20 | 0 | 10 |
| | 8 | 281 | 28 | 0 | 0 | 0 | 10 |
| | 9 | 281 | 0 | 28 | 20 | 0 | 10 |
| | 10 | 248 | 0 | 0 | 20 | 0 | 0 |
| | 11 | 354 | 0 | 0 | 20 | 0 | 0 |
| | 12 | 447 | 0 | 0 | 20 | 0 | 0 |
| | 13 | 378 | 0 | 0 | 20 | 0 | 0 |
| | 14 | 241 | 0 | 0 | 20 | 0 | 0 |
| | 15 | 375 | 63 | 0 | 0 | 0 | 17 |
| | 16 | 338 | 56 | 0 | 0 | 0 | 17 |
| | 17 | 253 | 56 | 0 | 0 | 0 | 22 |
| | 18 | 225 | 50 | 0 | 0 | 0 | 22 |
| | 19 | 456 | 28 | 0 | 0 | 0 | 6 |
| | 20 | 281 | 0 | 28 | 0 | 0 | 10 |
| | 21 | 309 | 0 | 0 | 20 | 0 | 0 |
| | 22 | 422 | 56 | 0 | 0 | 0 | 13 |
| | 23 | 253 | 56 | 0 | 0 | 0 | 22 |
| Comp. Ex. | 1 | 0 | 458 | 0 | 0 | 0 | — |
| | 2 | 307 | 0 | 0 | 0 | 0 | 0 |
| | 3 | 516 | 0 | 0 | 20 | 0 | 0 |

TABLE 2-2

| | | | | | | Fine aggregate | | Coarse aggregate | |
|---|---|---|---|---|---|---|---|---|---|
| | | Water W [kg/m³] | Water/blast furnace slag W/BF [%] | Silica fume SF [kg/m³] | Fly ash FA [kg/m³] | Ferro-nickel slag FNS [kg/m³] | Hard sand stone HS [kg/m³] | Hard sand stone crushed stone HG [kg/m³] | Crushed limestone LG [kg/m³] |
| Ex. | 1 | 90 | 29 | 84 | 169 | 1,105 | 0 | 0 | 832 |
| | 2 | 90 | 29 | 84 | 169 | 1,105 | 0 | 0 | 832 |
| | 3 | 90 | 29 | 84 | 169 | 1,105 | 0 | 0 | 832 |
| | 4 | 90 | 30 | 85 | 170 | 1,106 | 0 | 0 | 830 |
| | 5 | 90 | 36 | 84 | 169 | 1,109 | 0 | 0 | 833 |
| | 6 | 90 | 36 | 84 | 169 | 1,109 | 0 | 0 | 833 |
| | 7 | 90 | 32 | 84 | 169 | 1,105 | 0 | 0 | 833 |
| | 8 | 90 | 32 | 84 | 169 | 1,105 | 0 | 0 | 833 |
| | 9 | 90 | 32 | 84 | 169 | 1,106 | 0 | 0 | 803 |
| | 10 | 90 | 36 | 68 | 135 | 1,175 | 0 | 0 | 885 |
| | 11 | 90 | 25 | 96 | 193 | 1,055 | 0 | 0 | 793 |
| | 12 | 130 | 29 | 122 | 244 | 882 | 0 | 0 | 664 |
| | 13 | 110 | 29 | 103 | 206 | 993 | 0 | 0 | 748 |
| | 14 | 70 | 29 | 66 | 131 | 1,217 | 0 | 0 | 915 |
| | 15 | 100 | 27 | 63 | 125 | 1,065 | 0 | 774 | 0 |
| | 16 | 90 | 27 | 56 | 113 | 1,120 | 0 | 812 | 0 |
| | 17 | 90 | 36 | 84 | 169 | 1,109 | 0 | 803 | 0 |
| | 18 | 80 | 36 | 75 | 150 | 1,164 | 0 | 843 | 0 |
| | 19 | 90 | 20 | 79 | 0 | 1,126 | 0 | 0 | 848 |
| | 20 | 90 | 32 | 84 | 169 | 1,107 | 0 | 801 | 0 |
| | 21 | 90 | 29 | 84 | 169 | 0 | 971 | 0 | 832 |
| | 22 | 90 | 21 | 84 | 0 | 1,128 | 0 | 818 | 0 |
| | 23 | 90 | 36 | 84 | 169 | 0 | 975 | 803 | 0 |

TABLE 2-2-continued

| | | Water W [kg/m³] | Water/blast furnace slag W/BF [%] | Silica fume SF [kg/m³] | Fly ash FA [kg/m³] | Fine aggregate Ferronickel slag FNS [kg/m³] | Hard sand stone HS [kg/m³] | Coarse aggregate Hard sand stone crushed stone HG [kg/m³] | Crushed limestone LG [kg/m³] |
|---|---|---|---|---|---|---|---|---|---|
| Comp. Ex. | 1 | 165 | — | 0 | 0 | 0 | 699 | 998 | 0 |
| | 2 | 90 | 30 | 85 | 170 | 1,106 | 0 | 0 | 830 |
| | 3 | 150 | 29 | 141 | 281 | 772 | 0 | 0 | 580 |

Comparative Example 2 was not fluidized. Comparative Example 3 had material segregation, and was unable to be used in subsequent tests.

<Slump Flow Measurement Test>

Immediately after each concrete composition was obtained, slump flow measurement was performed immediately. The method for measuring the slump flow was based on "Method of test for slump flow of concrete" on JIS A 1150. The results of the measurement are presented in Table 3.

<Compressive Strength>

Each concrete composition was put in a cylindrical specimen (a cylinder with a diameter of 100 mm×200 mm) for compressive strength measurement, and sealed-cured in an environment of 20 degrees C. and 60% RH. Formworks used for all of the cylindrical specimens were simple formworks formed of steel.

Next, the compressive strength of these specimens was measured at a material age of 7 days according to "Method of test for compressive strength of concrete" on Japanese Industrial Standards JIS A 1108. As the compressive strength, the average value of three specimens (N=3) for each preparation and each curing temperature is presented. The material ages at which the compressive strength was measured were two material ages of 7 days and 28 days for all. All of the specimens were polished on both end surfaces immediately before the compression test was performed. The compressive strength was measured using a 3000 KN compression tester (available from Shimadzu Corporation). The results of the measurement are presented in Table 3.

TABLE 3

| | Slump flow value [cm] | Compressive strength Material age | |
|---|---|---|---|
| | | 7 days [N/mm²] | 28 days [N/mm²] |
| Ex. 1 | 73.5 | 49.8 | 65.3 |
| Ex. 2 | 76.0 | 36.2 | 49.5 |
| Ex. 3 | 77.3 | 23.8 | 41.4 |
| Ex. 4 | 75.5 | 42.8 | 67.7 |
| Ex. 5 | 72.5 | 65.4 | 87.8 |
| Ex. 6 | 71.5 | 58.4 | 82.5 |

TABLE 3-continued

| | Slump flow value [cm] | Compressive strength Material age | |
|---|---|---|---|
| | | 7 days [N/mm²] | 28 days [N/mm²] |
| Ex. 7 | 74.3 | 52.4 | 73.2 |
| Ex. 8 | 74.5 | 40.6 | 58.6 |
| Ex. 9 | 64.0 | 58.1 | 77.6 |
| Ex. 10 | 52.3 | 32.3 | 54.1 |
| Ex. 11 | 75.0 | 44.5 | 73.5 |
| Ex. 12 | 83.0 | 30.9 | 54.1 |
| Ex. 13 | 77.0 | 33.5 | 55.9 |
| Ex. 14 | 42.5 | 37.6 | 59.0 |
| Ex. 15 | 75.1 | — | 100.1 |
| Ex. 16 | 67.6 | — | 89.1 |
| Ex. 17 | 71.6 | 60.0 | 87.5 |
| Ex. 18 | 62.1 | — | 80.2 |
| Ex. 19 | 66.0 | 50.2 | 71.1 |
| Ex. 20 | 68.0 | 41.6 | 60.0 |
| Ex. 21 | 55.5 | 41.9 | 67.4 |
| Ex. 22 | 65.2 | — | 86.3 |
| Ex. 23 | 58.5 | 50.1 | 74.7 |
| Comp. Ex. 1 | 37.0 | 54.7 | — |
| Comp. Ex. 2 | — | — | — |
| Comp. Ex. 3 | — | — | — |

<Measurement of Shrinkage Strain>

The shrinkage strain of the concrete compositions of Examples 16 and 22 was measured in the manner described below. The results are presented in Table 4.

The shrinkage strain was measured according to a method compliant with the method of Autogenous Shrinkage Study Group of Japan Concrete Institute and Superfluid Concrete Study Group of Japan Concrete Institute until a material age of 7 clays. Subsequently, the material was unsealed, and a synthetic value of the autogenous shrinkage strain and the drying shrinkage strain was measured in a dry environment. The results of the measurement of the shrinkage strain (autogenous shrinkage strain+drying shrinkage strain) at a material age of 28 days are presented in Table 4.

TABLE 4

| | Cement | | | | | Fine aggregate | | Coarse aggregate Hard | |
|---|---|---|---|---|---|---|---|---|---|
| | Blast furnace slag BF [kg/m³] | Ordinary Portland cement NC [kg/m³] | Water W [kg/m³] | Silica fume SF [kg/m³] | Fly ash FA [kg/m³] | Ferro-nickel slag FNS [kg/m³] | Hard sandstone HS [kg/m³] | sandstone crushed stone HG [kg/m³] | Shrinkage strain |
| Ex. 16 | 253 | 56 | 90 | 84 | 169 | 1,109 | 0 | 803 | −112 |
| Ex. 22 | 253 | 56 | 90 | 84 | 169 | 0 | 975 | 803 | −784 |

The shrinkage strain was also measured in Examples 1, 2, 7, and 16 in the same manner as in Example 16. The results are presented in Tables 5-1 and 5-2.

TABLE 5-1

| | Blast furnace slag BF [kg/m³] | Cement Ordinary Portland cement NC [kg/m³] | Binder property inducing material for blast furnace slag Expansive additive (EX) Lime-based EX2 [kg/m³] | Cement/blast furnace slag mass ratio C/BF [%] | Water W [kg/m³] | Water/blast furnace slag W/BF [%] |
|---|---|---|---|---|---|---|
| Ex. 1 | 309 | 0 | 20 | 0 | 90 | 29 |
| 2 | 309 | 0 | 10 | 0 | 90 | 29 |
| 7 | 281 | 28 | 0 | 10 | 90 | 32 |
| 16 | 253 | 56 | 0 | 22 | 90 | 36 |

TABLE 5-2

| | Silica fume SF [kg/m³] | Fly ash FA [kg/m³] | Fine aggregate Ferro-nickel slag FNS [kg/m³] | Coarse aggregate Hard sandstone crushed stone HG [kg/m³] | Crushed limestone LG [kg/m³] | Shrinkage strain |
|---|---|---|---|---|---|---|
| Ex. 1 | 84 | 169 | 1,105 | 0 | 832 | 10 |
| 2 | 84 | 169 | 1,105 | 0 | 832 | 72 |
| 7 | 84 | 169 | 1,105 | 0 | 833 | −41 |
| 16 | 84 | 169 | 1,109 | 803 | 0 | −112 |

Examples 24 to 33 and Comparative Examples 4 to 6

<Production of Concrete Composition>

Concrete compositions of Examples 24 to 33 and Comparative Examples 4 to 6 were produced according to the recipe presented in Table 7. For each concrete composition, the components other than water were fed into a biaxial forced mixer having a nominal capacity of 0.1 m³ (available from Pacific Machinery & Engineering Co., Ltd., SD-100, 200 V three-phase motor output of 7.5 kW) in a thermostatic chamber of 20 degrees C., dry-mixed for 15 seconds, and then mixed for 300 seconds with water added. The mixing amount per batch was constant at 0.090 m³.

Abbreviations, product names, and manufacturer or distributor names of the components used in Examples 24 to 33 and Comparative Examples 4 to 6 are as presented in Table 6 below.

TABLE 6

| | | Abbrev. | Product name | Physical property | Manufacturer/distributer name |
|---|---|---|---|---|---|
| | Blast furnace slag | CRA | CERAMENT | Density: 2.89 Specific surface area: 4,400 cm²/g | DC Co., Ltd. |
| | Expansive additive | EX | TAIHEIYO N-EX | Density: 3.19 Specific surface area: 4,970 cm²/g | Taiheiyo Materials Corporation |
| | Silica fume | SF | EFACO | Density: 2.20 Specific surface area: 200,000 cm²/g | Tomoe Engineering Co., Ltd. |
| | Fly ash | FA | FINASH (permissible substitute for JIS type I) | Density: 2.40 Specific surface area: 5,540 cm²/g | Yonden Business Co., Inc. |
| Fine aggregate | Ferro-nickel slag fine aggregate | FNS | PAMCOSAND | Density: 2.98 Coefficient of water absorption: 2.25 | Taiheiyo Kinzoku Corporation |

TABLE 6-continued

| | | Abbrev. | Product name | Physical property | Manufacturer/distributer name |
|---|---|---|---|---|---|
| Coarse aggregate | Hard sandstone crushed stone | HG | — | Density: 2.64 Coefficient of water absorption: 0.68 | Ores Inc. |

TABLE 7

| | | Blast furnace slag CRA [kg/m$^3$] | Expansive additive (EX) EX [kg/m$^3$] | Water W [kg/m$^3$] | Water/blast furnace slag W/CRA [%] | Silica fume SF [kg/m$^3$] | Fly ash FA [kg/m$^3$] | Fine aggregate Ferro-nickel slag FNS [kg/m$^3$] | Coarse aggregate Hard sandstone crushed stone HG [kg/m$^3$] |
|---|---|---|---|---|---|---|---|---|---|
| Ex. | 24 | 309 | 20 | 90 | 29 | 84 | 169 | 1,080 | 784 |
| | 25 | 309 | 40 | 90 | 29 | 84 | 169 | 1,080 | 784 |
| | 26 | 309 | 50 | 90 | 29 | 84 | 169 | 1,080 | 784 |
| | 27 | 309 | 10 | 90 | 29 | 84 | 169 | 1,080 | 784 |
| | 28 | 309 | 5 | 90 | 29 | 84 | 169 | 1,080 | 784 |
| | 29 | 309 | 3 | 90 | 29 | 84 | 169 | 1,080 | 784 |
| | 30 | 275 | 20 | 80 | 29 | 75 | 150 | 1,136 | 824 |
| | 31 | 344 | 20 | 100 | 29 | 94 | 188 | 1,025 | 743 |
| | 32 | 413 | 20 | 120 | 29 | 113 | 225 | 913 | 663 |
| | 33 | 447 | 20 | 130 | 29 | 122 | 244 | 858 | 622 |
| Comp. Ex. | 4 | 516 | 20 | 150 | 29 | 141 | 281 | 746 | 541 |
| | 5 | 309 | 0.5 | 90 | 29 | 84 | 169 | 1,080 | 784 |
| | 6 | 206 | 20 | 60 | 29 | 56 | 113 | 1,248 | 904 |

Comparative Example 4 had material segregation, and was unable to be used in subsequent tests.

<Slump Flow Measurement Test and Compressive Strength>

The slump flow and the compressive strength of the concrete compositions of Examples 24 to 33 and Comparative Examples 4 to 6 were measured in the same manners as in Example 1. The results of the measurement are presented in Table 8.

TABLE 8

| | Slump flow value [cm] | Compressive strength Material age 7 days [N/mm$^2$] | Compressive strength Material age 28 days [N/mm$^2$] |
|---|---|---|---|
| Ex. 24 | 74.8 | 57.7 | 74.9 |
| Ex. 25 | 72.6 | 70.8 | 87.4 |
| Ex. 26 | 73.0 | 76.3 | 94.4 |
| Ex. 27 | 73.8 | 47.8 | 63.0 |
| Ex. 28 | 77.3 | 31.2 | 51.5 |
| Ex. 29 | 76.0 | 21.7 | 44.3 |
| Ex. 30 | 57.7 | 56.2 | 72.3 |
| Ex. 31 | 76.4 | 53.8 | 71.7 |
| Ex. 32 | 87.9 | 54.0 | 69.1 |
| Ex. 33 | 88.4 | 49.3 | 67.6 |
| Comp. Ex. 4 | — | — | — |
| Comp. Ex. 5 | — | — | 3.8 |
| Comp. Ex. 6 | — | 30.5 | 34.0 |

Comparative Examples 5 and 6 were not fluidized.

Because Comparative Example 5 had not been cured on the 7th day, the compressive strength at the material age of 7 days was unable to be measured.

The invention claimed is:

1. A concrete composition, comprising:
   blast furnace slag;
   at least any one of expansive additive and cement; and
   water,
   wherein a content of the blast furnace slag is from 200 kg/m$^3$ to 500 kg/m$^3$ relative to the concrete composition as a whole,
   wherein a unit water content of the water is 130 kg/m$^3$ or less;
   wherein a content of the cement is 22% by mass or less relative to the blast furnace slag, and
   wherein a slump flow value of the concrete composition is 40 cm or greater.

2. The concrete composition according to claim 1, wherein the slump flow value is 50 cm or greater.

3. The concrete composition according to claim 1, wherein the unit water content of the water is 100 kg/m$^3$ or less.

4. The concrete composition according to claim 1, wherein a content of the expansive additive is 3 kg/m$^3$ or greater.

5. The concrete composition according to claim 1, wherein a content of the expansive additive is 5 kg/m$^3$ or greater.

6. The concrete composition according to claim 1, further comprising:
   ferro-nickel slag.

7. The concrete composition according to claim 1, wherein the content of the cement is 0% by mass relative to the blast furnace slag.

8. The concrete composition according to claim 1, further comprising:
   limestone.

9. The concrete composition according to claim 1, wherein the expansive additive is lime-based expansive additive.

10. A method for producing a concrete composition that comprises blast furnace slag, at least any one of expansive additive and cement, and water,
- wherein a content of the blast furnace slag is from 200 kg/m$^3$ to 500 kg/m$^3$ relative to the concrete composition as a whole,
- wherein a unit water content of the water is 130 kg/m$^3$ or less;
- wherein a content of the cement is 22% by mass or less relative to the blast furnace slag, and
- wherein a slump flow value of the concrete composition is 40 cm or greater.

* * * * *